United States Patent [19]

Spatafora et al.

[11] Patent Number: 5,381,884
[45] Date of Patent: Jan. 17, 1995

[54] METHOD AND DEVICE FOR ALIGNING FLAT PRODUCTS

[75] Inventors: Mario Spatafora; Giulio Strazzari, both of Bologna, Italy

[73] Assignee: Azionaria Costruzioni Macchine Automatiche A.C.M.A. S.p.A., Bologna, Italy

[21] Appl. No.: 262,351

[22] Filed: Jun. 20, 1994

Related U.S. Application Data

[63] Continuation of Ser. No. 964,309, Oct. 21, 1992, abandoned.

[30] Foreign Application Priority Data

Oct. 21, 1991 [IT] Italy ............ BO91A 000384

[51] Int. Cl.⁶ ............................................. B65G 47/26
[52] U.S. Cl. ........................... 198/433; 198/430; 198/803.5
[58] Field of Search ............... 198/426, 428, 430, 432, 198/433, 471.1, 803.5, 598

[56] References Cited

U.S. PATENT DOCUMENTS

| | | | |
|---|---|---|---|
| 3,929,234 | 12/1975 | Warren | 198/430 X |
| 3,952,865 | 4/1976 | Rudszinat et al. | 198/803.5 X |
| 4,645,063 | 2/1987 | Seragnoli | 198/471.1 X |
| 5,022,511 | 6/1991 | Gorrieri et al. | 198/803.5 X |

FOREIGN PATENT DOCUMENTS

| | | |
|---|---|---|
| 2017254 | 5/1970 | France . |
| 2244174 | 3/1973 | Germany ............ 198/471.1 |
| 302179 | 10/1965 | Netherlands . |
| 678616 | 10/1991 | Switzerland . |
| 2199297 | 7/1988 | United Kingdom . |

Primary Examiner—James R. Bidwell
Attorney, Agent, or Firm—Oblon, Spivak, McClelland, Maier & Neustadt

[57] ABSTRACT

A method and device for aligning flat products whereby the products, substantially aligned in transverse rows on a first conveyor, are fed on the first conveyor through a pickup station where the products in at least a portion of each row are picked up by a suction head traveling, parallel to itself at all times, along a circular path extending partially over the first conveyor; the aspirated products being transferred by the suction head along a portion of its path extending over an arc of 90° and between the pickup station and an unloading station where the aspirated products are unloaded on to a second conveyor perpendicular to the first conveyor.

5 Claims, 3 Drawing Sheets

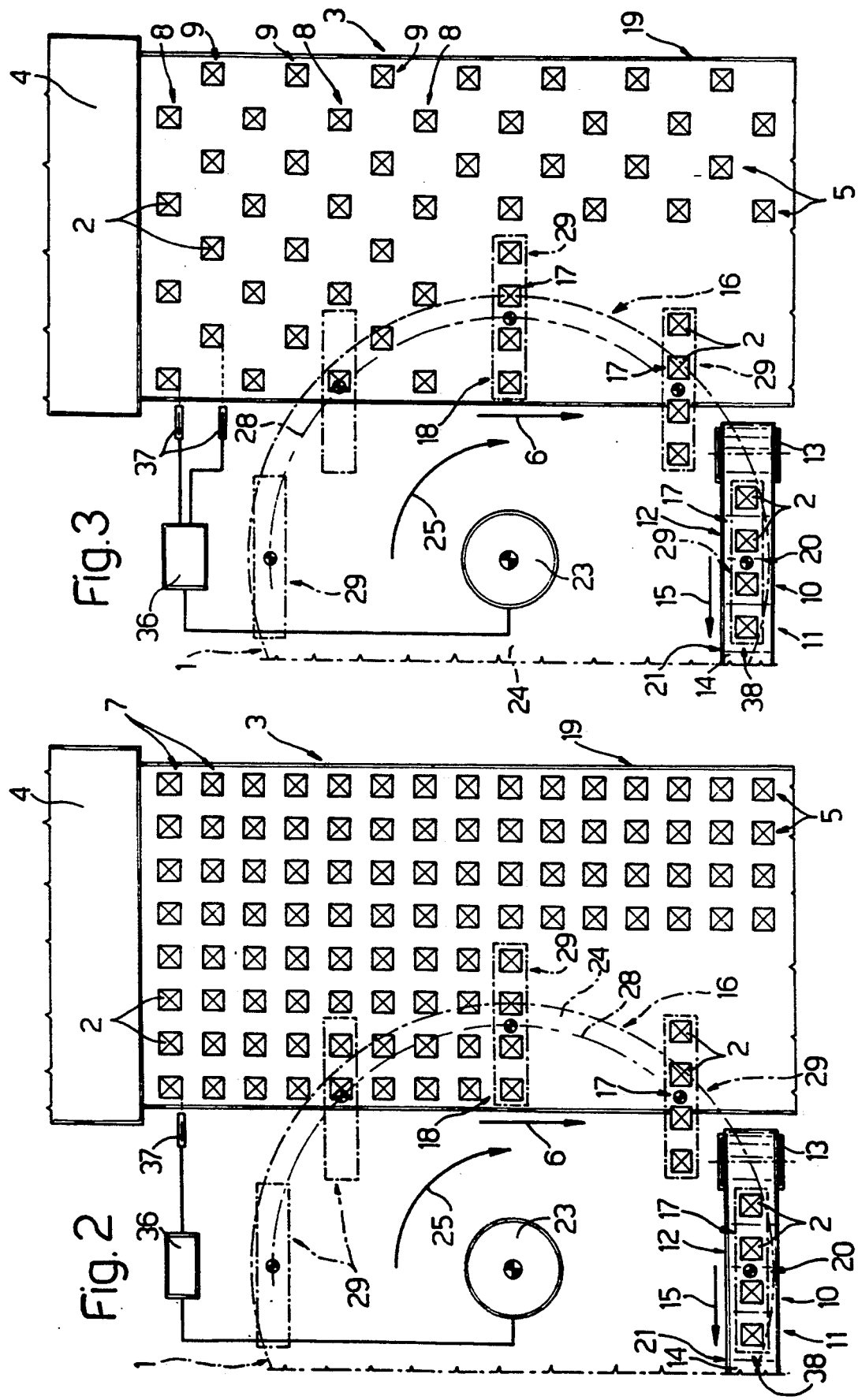

METHOD AND DEVICE FOR ALIGNING FLAT PRODUCTS

This application is a continuation of application Ser. No. 07/964,309, filed on Oct. 21, 1992, now abandoned.

BACKGROUND OF THE INVENTION

1. Field of the Invention

The present invention relates to a method of aligning flat products.

The present invention is especially suitable for use in the food industry, particularly for manufacturing flat products, such as biscuits or similar oven-baked products, to which the following description refers purely by way of example.

2. Discussion of the Background

Biscuits and the like are normally baked in tunnel type ovens through which they are fed on a conveyor, normally in neat side by side columns parallel to the traveling direction of the conveyor and defining neat rows perpendicular to the traveling direction.

The speed of the conveyor is so regulated as to bake the biscuits in the time taken for each row to travel between the input and output end of the oven.

On ovens of the aforementioned type, the same conveyor normally also provides for feeding the baked biscuits to an aligning device constituting the input device of a user unit, normally a wrapping line, and designed to arrange into a single column the products originally arranged, as stated, in a number of columns parallel to the traveling direction of the conveyor.

Known aligning devices normally comprise an accelerating device for spacing the biscuits in the original columns and feeding them to a concentrating device by which the original columns are formed into a single intersecting column for supply to the user unit.

The above method presents several drawbacks, mainly due to the single column supplied to the user unit being formed, as stated, by rearranging the existing columns into a single intersecting column, thus resulting in friction, impact and, possibly also, pile-up of the biscuits. The above method therefore results in frequent crumbling and/or breakage of the biscuits requiring frequent stoppage for cleaning the concentrating device and the line.

SUMMARY OF THE INVENTION

It is an object of the present invention to provide a method of aligning flat products, such as biscuits or similar, designed to overcome the aforementioned drawbacks.

According to the present invention, there is provided a method of aligning flat products, said method comprising stages consisting in arranging the products, on a first conveyor, in a number of neat columns parallel to a first traveling direction of the first conveyor and arranged side by side so as to define a succession of product rows perpendicular to the first traveling direction; and in feeding the columns axially along a first given path; characterized by the fact that it also comprises stages consisting in feeding at least one suction head along a second circular path extending partially over the first path, the suction head moving along the second path and being so oriented as to overlap at least a portion of at least one said row at a pickup station along the first path; in activating the suction head at said pickup station, so as to suck the products in said portion of said row on to said suction head; in transferring the aspirated products, by means of the suction head, along a portion of the second path extending between the pickup station and an unloading station; and in releasing the aspirated products at said unloading station on to a second conveyor extending along a third path parallel to the position assumed by the suction head at the unloading station.

The speed at which the suction head is fed along the second path is substantially equal to the speed of the second conveyor and greater than the speed of the first conveyor.

The present invention also relates to a device for aligning flat products.

According to the present invention, there is provided a device for aligning flat products, the device being designed to cooperate with a first conveyor on which the products are arranged in a number of neat columns parallel to a first traveling direction of the first conveyor; the columns being arranged side by side so as to define a succession of product rows perpendicular to the first traveling direction; and the first conveyor being designed to feed the columns axially along a first given path and through a pickup station; characterized by the fact that it comprises at least one suction head; drive means for moving the suction head along a second circular path extending partially over the first path, the suction head moving along the second path and being so oriented as to overlap with at least a portion of at least one said row at said pickup station; a second conveyor extending in a second direction and along a third path forming a given angle in relation to said rows, and through an unloading station along the second path; and activating means for activating the suction head at the pickup station so as to suck the products in said portion of said row on to the suction head, and for deactivating the suction head at the unloading station so as to release the aspirated products on to the second conveyor; the suction head and the second conveyor being similarly oriented at the unloading station.

BRIEF DESCRIPTION OF THE DRAWINGS

A non-limiting embodiment of the present invention will be described by way of example with reference to the accompanying drawings, in which:

FIG. 2 shows a partial plan view of the FIG. 1 device;

FIG. 3 shows a variation of FIG. 2;

DESCRIPTION OF THE PREFERRED EMBODIMENTS

Figure 1:
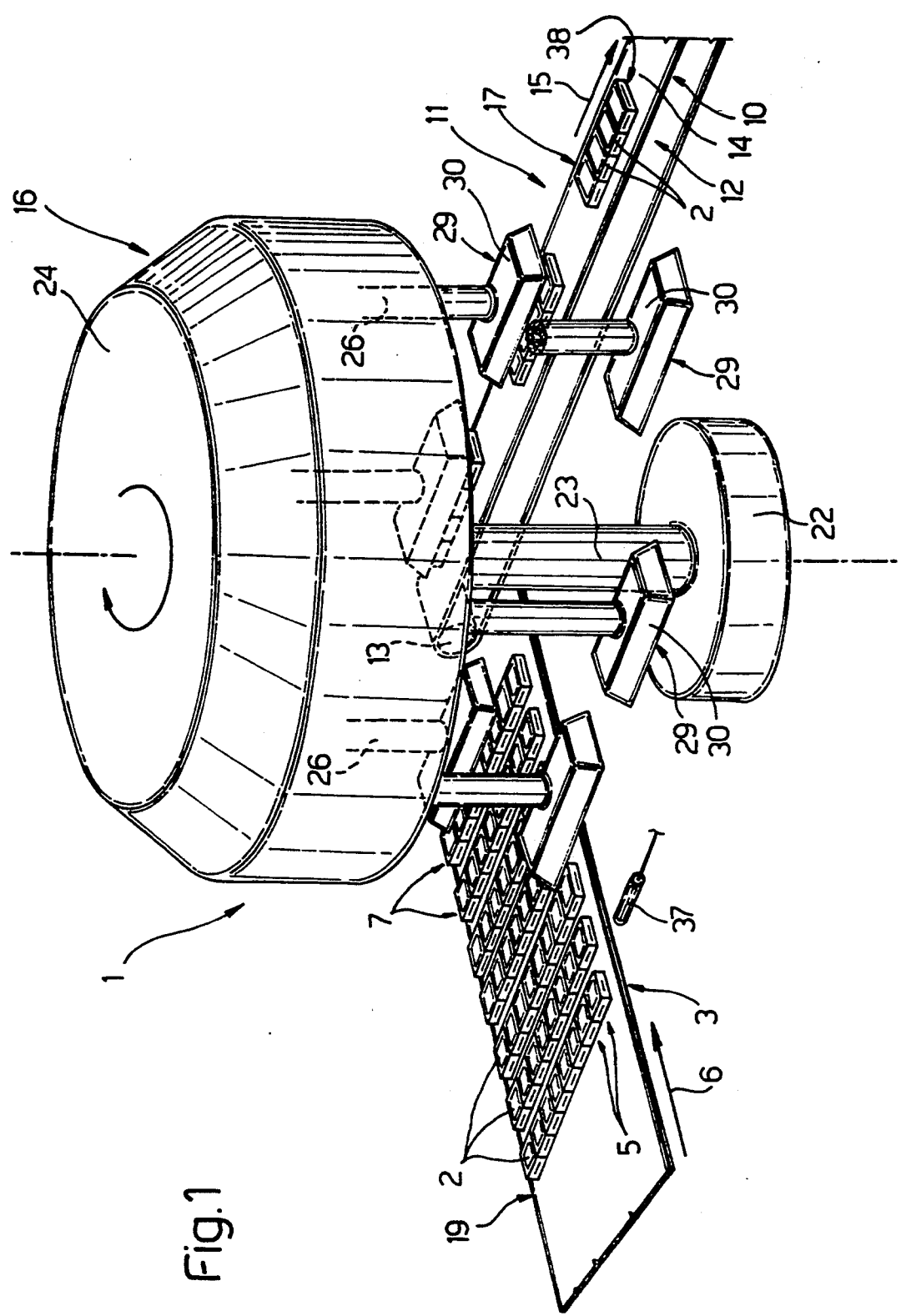
FIG. 1 shows a schematic view in perspective of a preferred embodiment of the device according to the present invention.

Number 1 in FIG. 1 indicates a device for aligning flat products, in this case biscuits 2, and cooperating with the output conveyor 3 of an oven 4 (FIGS. 2 and 3) for baking biscuits 2.

Conveyor 3 is a belt conveyor extending through the output end of oven 4 and supporting biscuits 2 arranged neatly in a number of columns 5 parallel to traveling direction 6 and equally spaced across the width of conveyor 3.

As shown in FIG. 2, each biscuit 2 in each column 5 is aligned with a respective biscuit 2 in the adjacent columns, so as to form a row 7 extending across conveyor 3 and perpendicular to traveling direction 6.

According to the variation shown in FIG. 3, the biscuits 2 are arranged in successive pairs of transverse rows 8 and 9 in which biscuits 2 in each row 8 are offset in relation to those in respective row 9.

Device 1 comprises a conveyor 10 constituting the input conveyor of a packing line 11 and extending perpendicular to conveyor 3. Conveyor 10 comprises a belt 12 looped about two pulleys 13 (only one of which is shown, and at least one of which is powered) and comprising a transportation branch 14 traveling in direction 15 perpendicular to direction 6 and extending over conveyor 3 in a substantially horizontal plane parallel to the plane of conveyor 3.

Device 1 also comprises at least one pickup device 16 for successively picking up groups 17 of biscuits 2 at a pickup station 18 located along path 19 along which biscuits 2 are fed by conveyor 3, and for transferring the groups 17 on to conveyor 10 at an unloading station 20 located along path 21 along which biscuits 2 are fed by conveyor 10.

As shown in FIG. 2, each group 17 comprises a number of biscuits 2, four in the example shown, aligned along a portion of the same row 7.

In the FIG. 3 variation, each group 17 comprises a number of biscuits 2, four in the example shown, aligned partly along a portion of row 8 and partly along a corresponding portion of respective row 9.

Device 16 comprises a base 22 from which extends an upright 23 supporting a powered carrousel conveyor 24 rotating clockwise (in FIGS. 2 and 3) in direction 25 about the axis of upright 23.

Conveyor 24 is a known carrousel conveyor having a number of vertical output rods 26, each connected to conveyor 24 so as to move axially, as determined by a known cam device (not shown) housed inside conveyor 24, and to rotate about its axis 27 (FIG. 4) in the opposite direction to and at the same speed as conveyor 24. Thus, as conveyor 24 is rotated, rods 26 travel, parallel to themselves at all times, along a circular path 28 extending about upright 23 and partially over conveyor 3 at pickup station 18 and conveyor 10 at unloading station 20. The bottom end of each rod 26 is fitted integral with a suction head 29 traveling with rod 26 along path 28 at a faster speed than conveyor 3 and perpendicular at all times to columns 5.

Conveyors 24 and 3 are so timed that, as it travels along path 28, each suction head 29, at pickup station 18, overlaps a portion of a respective row 7 (FIG. 2), or sweeps over respective portions of adjacent rows 8 and 9 (FIG. 3).

Figure 4:
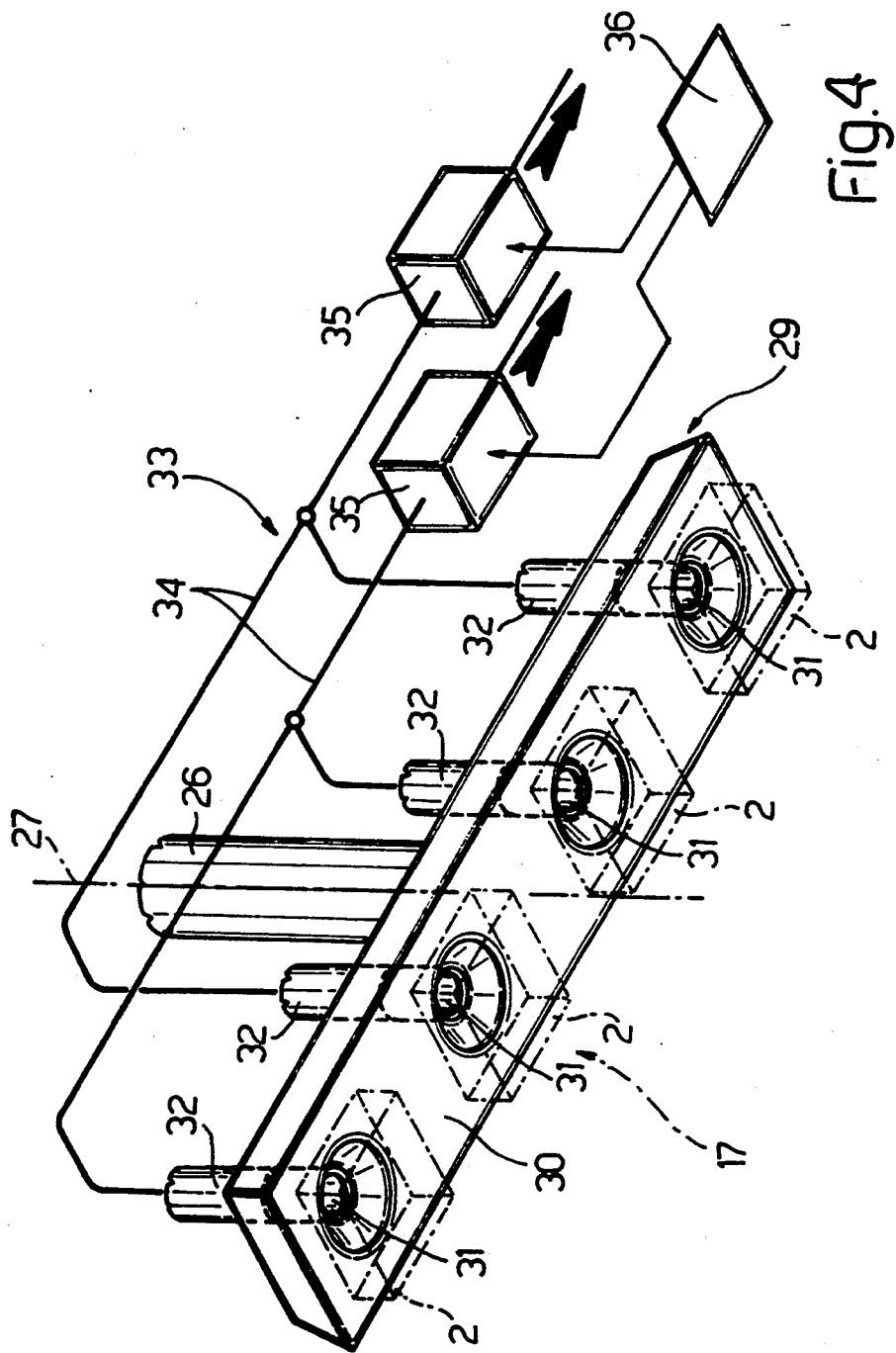
FIG. 4 shows a view in perspective of a detail in FIG. 3.

As shown in FIG. 4, each suction head 29 comprises a plate 30 which, at pickup station 18, extends transversely over a given number of columns 5 (four, in the example shown), and presents a number of through suction holes 31 communicating via respective conduits 32 with a suction circuit 33.

In the case of biscuits 2 arranged on conveyor 3 as shown in FIG. 3, alternate holes 31 on head 29 are parallel connected to a separate manifold 34, and each manifold 34 presents a respective valve 35 controlled, via a known delay device 36, by a respective sensor 37 for detecting rows 8 and 9 on conveyor 3 and synchronizing conveyors 24 and 3 as described above.

Conversely, in the case of biscuits 2 arranged on conveyor 3 as shown in FIG. 2, holes 31 on head 29 are all connected (not shown) to the same manifold 34, which presents a valve 35 controlled, via a known delay device 36, by a sensor 37 for detecting rows 7 on conveyor 3 and synchronizing conveyors 24 and 3 as described above.

In both the FIG. 2 and 3 arrangements, each valve 35 is so controlled by sensor 37 as to provide for suction through holes 31 as head 29 travels through pickup station 18, and to disable suction through holes 31 as head 29 travels through unloading station 20, i.e. upon head 29 traveling over a substantially 90° arc of path 28.

Operation of device 1 will now be described with reference to the embodiment shown in FIGS. 3 and 4.

With reference to FIG. 3, as a pair of adjacent rows 8 and 9 of biscuits 2 travels past respective sensors 37 spaced along path 19 in the same way as rows 8 and 9, sensors 37 emit respective signals for so regulating conveyor 24 that rows 8 and 9 travel through pickup station 18 simultaneously with a suction head 29 traveling at a faster speed V1 than the speed V2 of conveyor 3. Delay device 36 controls the signals emitted by sensors 37 in known manner so as to open valves 35 as suction head 29 travels through pickup station 18, and so enable head 29 to form a group 17 of biscuits 2 by sucking up first biscuits 2 in row 9 followed by those in row 8 located upstream from row 9 in the traveling direction 6 of conveyor 3.

The aspirated group 17 is fed parallel to itself along path 28 to unloading station 20, where valves 35 are closed in known manner by delay device 36 so as to release group 17 on to conveyor 10 in such a position as to form, with the foregoing groups 17 on conveyor 10, a single column 38 parallel to rows 8 and 9 and which is fed on conveyor 10 in direction 15 at a speed V3 substantially equal to speed V1.

A group of columns 5 is thus formed, with no contact between biscuits 2, into a single column 38 for supply to wrapping line 11, while the remaining columns 5 proceed on conveyor 3 past device 1, and are formed into a single column by one or more devices 1 (not shown) downstream from pickup station 18 along path 19.

Operation of device 1 in FIGS. 1 and 2 is readily discernible from the above description and therefore requires no further explanation.

What is claimed as new and desired to be secured by Letters Patent of the United States is:

1. A method of aligning flat products, said method comprising:
    arranging the products, on a first conveyor, in a plurality of columns parallel to a first direction of travel of the first conveyor and arranged side by side so as to define a succession of product rows perpendicular to the first direction of travel;
    feeding the columns axially along a first path at a first speed, said first speed being a continuous speed;
    advancing at least one suction head along a second path which is circular, which extends partially over the first path, wherein the suction head, when moving along the second path, is oriented, at a pickup station along the first path, transversely to said first path to overlap at least a portion of at least one of said rows at said pickup station;
    activating the suction head at said pickup station, so as to suck the products in said portion of said row upward on to said suction head;
    transferring the aspirated products, by means of the suction head, along a portion of the second path extending between the pickup station and an unloading station; and releasing the aspirated products at said unloading station on to a second conveyor which moves at a second continuous speed along a third path parallel to the position assumed by the suction head at the unloading station, wherein the suction head is advanced along the second path at a speed substantially equal to the second speed and greater than the first speed.

2. A device for aligning flat products, the device comprising:
- a first conveyor on which the products are arranged in a number of columns parallel to a first direction of travel of the first conveyor, the columns being arranged side by side so as to define a succession of product rows perpendicular to the first direction of travel and the first conveyor being designed to advance the columns axially at a first continuous speed along a first path and through a pickup station;
- at least one suction head;
- a drive member for moving the suction head along a second path, which extends partially over the first path and wherein the second path comprises a circular path;
- the suction head, when moving along the second path, being oriented at said pickup station, transversely to said first path to overlap at least a portion of at least one of said rows;
- a second conveyor moving in a second direction at a second continuous speed along a third path extending through an unloading station along the second path; and
- an activator for activating the suction head at the pickup station so as to suck the products in said portion of said row on to the suction head, and for deactivating the suction head at the unloading station so as to release the aspirated products on to the second conveyor, the suction head and the second conveyor being similarly oriented at the unloading station and wherein the drive member for moving the suction head moves the suction head along the second path at a speed substantially equal to the second speed and greater than the first speed.

3. A device as claimed in claim 2, wherein in each pair of adjacent rows, the products in one row are offset in relation to those in the other row and the suction head overlaps at least a portion of at least two of said adjacent rows at said pickup station.

4. A device as claimed in claims 2 or 3, wherein for each said product in a group of said products, the suction head comprises individual suction mechanisms for holding the product on the suction head.

5. A device as claimed in claim 3, comprising at least one pickup device for cooperating with the first conveyor and which comprises a carousel conveyor for rotating about an axis thereof perpendicular to said rows and said columns wherein said carousel conveyor has a plurality of output rods equally spaced about said axis of rotation and said at least one suction head comprises a plurality of suction heads; and each of said rods is respectively fitted with one of said suction heads, and is connected to the carousel conveyor so as to travel with the conveyor along said second path with said one of said suction heads being maintained parallel at all times to said rows.

* * * * *